W. Bailey,
Hydrant.
No. 4,155. Reissued Oct. 18. 1870.
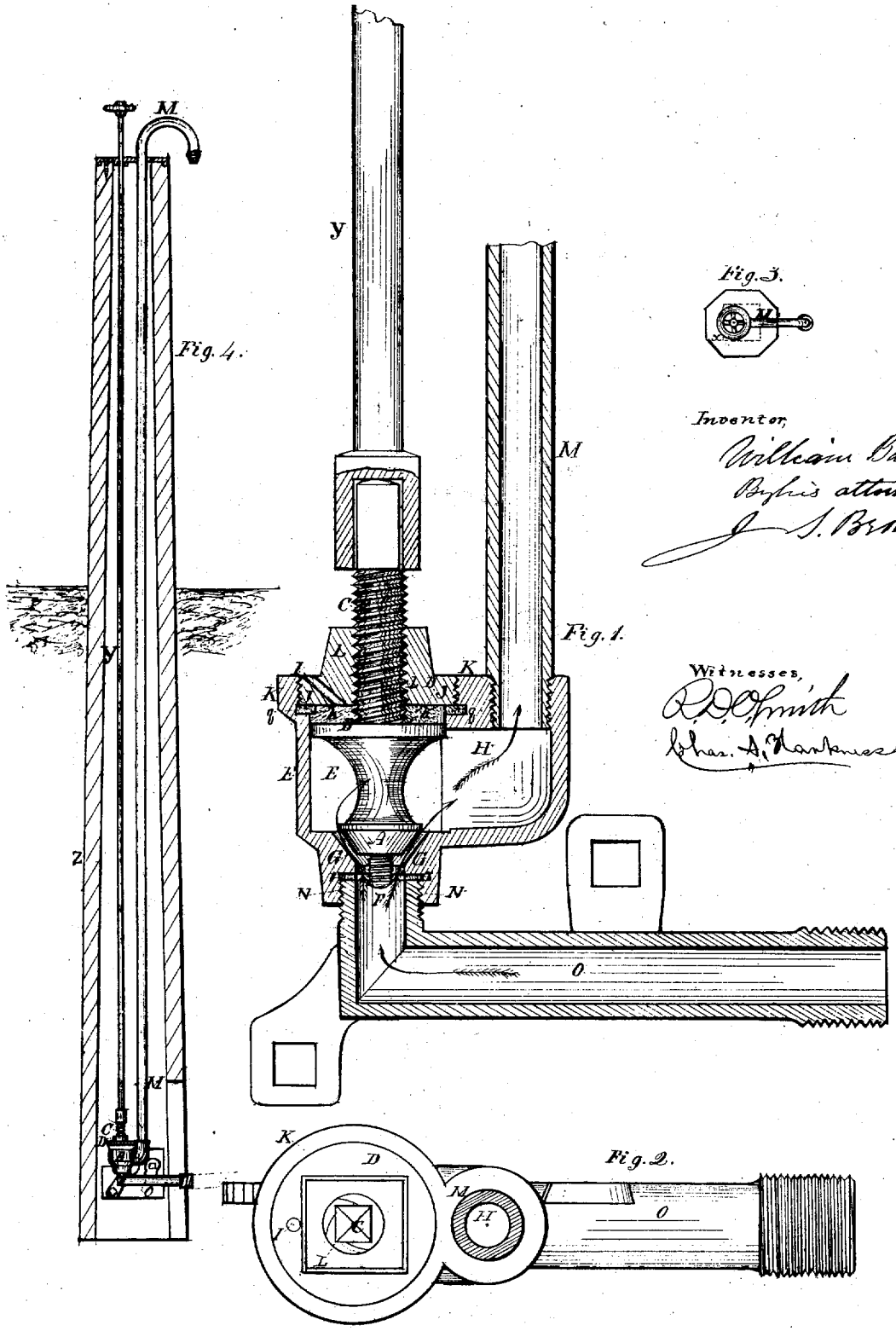
Inventor,
William Bailey,
By his attorney,
J. S. Brown
Witnesses,
R. D. Smith
Chas. A. Hawkness.
N. PETERS, PHOTO-LITHOGRAPHER, WASHINGTON, D. C.

United States Patent Office.

WILLIAM BAILEY, OF TROY, NEW YORK.

Letters Patent No. 48,504, dated July 4, 1865; reissue No. 4,155, dated October 18, 1870.

IMPROVEMENT IN HYDRANTS.

The Schedule referred to in these Letters Patent and making part of the same.

*To all whom it may concern:*

Be it known that I, WILLIAM BAILEY, of Troy, in the county of Rensselaer and State of New York, have invented certain new and useful Improvements in Hydrants; and I do hereby declare that the following is a full and exact description thereof, reference being had to the accompanying drawing making part of this specification—

Figure 1 being a partial central vertical section of a hydrant constructed with my improvements.

Figure 2, a top view thereof.

Figure 3, a top view, on a smaller scale, of the hydrant incased and mounted for use.

Figure 4, a side elevation of the same, the case being in vertical section.

Like letters designate corresponding parts in all of the figures.

Hydrants, from their generally excessive use, and because of the powerful pressure of water in them, and of the destructive force of such an inelastic fluid when its motion is suddenly stopped, and also because of its exposure to freezing weather, are continually liable to burst or get out of repair; and, since they are sunk in the ground, and, generally, beneath pavements, it is ordinarily troublesome and expensive to repair them.

One purpose of my invention is to provide for readily taking up a hydrant for repairs, and returning it to its place, without displacing the pavement or digging up the ground around it.

A permanently-fixed hydrant-case or box, Z, being so formed that the hydrant may be inserted into, drawn out of, and turned around in it, with no obstruction except a cover or lid, *x*, to open and close. I effect this improvement by means of a connecting-pipe section, O, to be screwed to, or form the termination of, the service-pipe, and affixed, by suitable flanches, as shown, or otherwise, to the bottom of the hydrant-box.

This connection-pipe terminates in a vertical portion, F, provided, as the most convenient means of secure attachment, with a screw-thread, (male or female,) by which the hydrant (with a corresponding screw-thread) is joined thereto, as shown at N, fig. 1.

Thus, by turning the hydrant around, it can be screwed on and off, for attachment and removal, with facility.

The discharge-pipe M of the hydrant, if sufficiently strong and firm, may be used to handle and turn the hydrant with in screwing on and off; or, if not, a proper key or wrench can be used for the purpose.

The joint N may be made securely tight by a packing-gasket, *r*.

The hydrant represented in the accompanying drawing has a valve, A, of conical or other form, closing against the pressure of the water upon a seat, G.

It is opened and closed by turning a screw, C, with a key, Y, so as to close it gradually, and avoid a concussion of the water.

Upon the same screw or shaft is also the waste-valve B, which opens and closes the vent-aperture I, for drawing off the water in the supply-pipe M after each drawing.

Since the valve B closes upward, while the valve A closes downward, they act alternately by one movement, as required.

The method of operating these valves with a screw heretofore has been by attaching them to a sliding nut, which travels upon and down on the screw in guides.

The construction of such a device adds unnecessary expense to the hydrant, and it is liable to be obstructed by rust and sand.

My improvement in this part of the invention consists in forming the valves A and B on the screw C, or fixedly attaching them, as one or separate, to the said screw, so that they turn therewith, while it travels up and down in a nut, D, secured in the case of the hydrant.

Thus not only is the construction simplified, but the valves work more freely, and with less liability to obstruction and to get out of repair.

The valve B and screw C may be tightened by a packing, *p*, and the nut D be screwed into the hydrant-case upon a packing, *q*.

As the valves of a hydrant are most liable of any part to wear or become injured, and, therefore, most frequently require removal for repairs or substitution, another feature of my invention consists in providing for the removal of the valves A B without removing the whole hydrant, or displacing the pavement or ground around the hydrant.

I accomplish this, as shown, by making the valve-nut or box D removable from the hydrant-body, it being attached to the top thereof by a screw, and provided with a square or other angular projection, L, or its equivalent, by which a key let down from above through the hydrant-case can be coupled to the nut, for detaching or attaching it.

This nut is made of larger diameter than the valves, so that, when it is removed, the valves can be drawn out of the hydrant, or reinserted, at pleasure.

What I claim as my invention, and desire to secure by Letters Patent, is—

1. The detachable valve-chamber E, with its discharge-pipe M, inlet-valve seat G, and screw-operated inlet-valve A, in combination with the fixed supply-pipe O, united to the said valve-chamber by the joint N, and arranged in the hydrant-box Z, substantially as and for the purpose herein specified.

2. The valves A and B and screw C, all fast together, in combination with the stationary screw-nut D, valve-chamber E, inlet-passage F, discharge-pipe M, waste-opening I, and valve-seats G and J, as and for the purpose herein described.

WM. BAILEY.

Witnesses:

HENRY A. MERRELL,

R. VINCENT O'BRIEN.